Aug. 10, 1965  S. A. BROWN  3,199,430
PHOTOPRINTING APPARATUS
Filed Oct. 7, 1963  2 Sheets-Sheet 1

INVENTOR
SILAS A. BROWN
BY
ATTORNEY

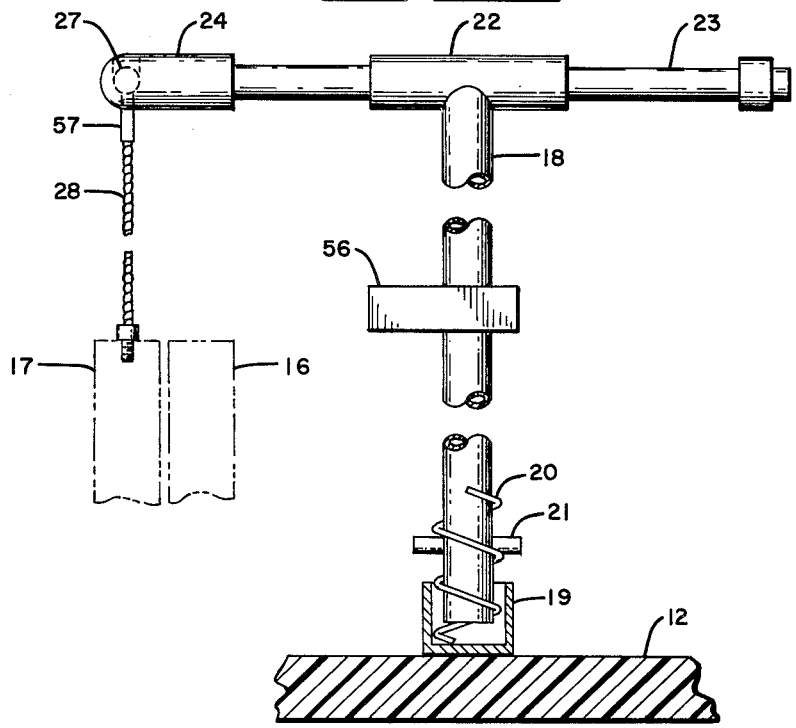
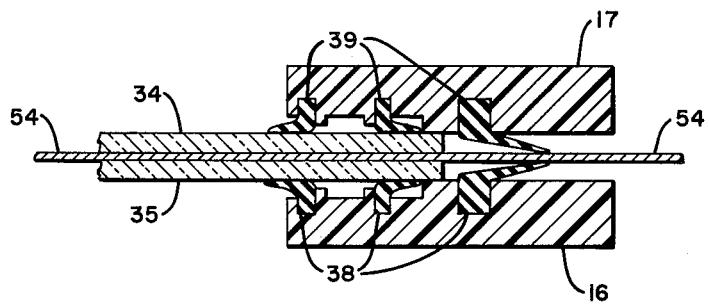

3,199,430
PHOTOPRINTING APPARATUS
Silas Arthur Brown, Lake Elmo, Minn., assignor to Buckbee-Mears Company, St. Paul, Minn., a corporation of Minnesota
Filed Oct. 7, 1963, Ser. No. 314,222
6 Claims. (Cl. 95—73)

This invention relates generally to photoprinting apparatus and particularly as directed toward improvements in apparatus utilized to photographically reproduce images on opposite sides of a sheet of light sensitive material in exact registry with one another.

In a typical case a thin sheet of light-sensitized metallic material or webbing is inserted between a pair of photographic plates, either negatives or positives, respectively attached to suitable frames. The patterns on the plates are then concurrently projected onto the light-sensitized surfaces of the webbing using well known photographic techniques. In addition to the pattern to be photographically reproduced on the webbing, the plates carry imprinted registration blocks or indices which must be aligned with one another or superimposed to insure precise registration of the projected patterns. The frames to which the plates are attached must therefore be mounted to one another in a manner such that they can be separated sufficiently to allow insertion and withdrawal of the webbing and can be adjusted to align the registration indices. Some difficulties have been encountered with the mountings used heretofore. There has been a tendency for the frames to shift during normal use so that frequent adjustment has been required to maintain the precise registration. Furthermore, each readjustment took considerable time because of the interaction among the adjusting mechanisms. Additionally, because of the complexity of the mounting, a small degree of wear in the individual piece parts of the mounts would make it impossible to adjust the frames into registration so that the apparatus had to be disassembled and new parts installed. Because of the complexity of the mounting structures, disassembly and reassembly was a time-consuming task.

It is an object of this invention to provide improved mounts in an apparatus for photoprinting images which must be accurately registered to one another.

It is a further object of this invention to provide means for facilitating the adjustment of the frames to bring the images on the photoprinting plates into accurate registration.

Still another object of this invention is to provide means for adjustably coupling together frames of a photoprinting apparatus of the nature described so that accurate registration of the images is maintained during normal use.

Still another object of this invention is to provide mounting means for photoprinting apparatus which facilitates assembly and disassembly.

In the preferred embodiment of this invention the frames are coupled to one another with ball and socket joints at three locations. Each of the joints includes a large diameter ball seated in a movable frame and a smaller diameter ball attached to the larger diameter ball and seated in a coextensive stationary frame which the movable frame overlays. A rod-like handle which is attached to the large diameter ball diametrically opposite where the smaller diameter ball is attached protrudes outward from the movable frame and is manipulated to cause the larger diameter ball to move about its center which in turn will cause the movable frame to move in its plane with respect to the fixed frame whereby the registration blocks on photographic plates attached to the respective frames are aligned. When the frames are initially coupled by inserting the balls into their respective sockets in the frames, the movable frame is adjusted at all of the joints to bring the registration blocks or indices on the plates into precise alignment. The larger diameter balls are then locked in this position by a tension plate on the movable frame. The frames can still be separated sufficiently to allow insertion and withdrawal of webbing between the plates without altering the registration. If during normal use something occurs to cause the plates to fall out of precise registration, fine adjustment of the movable frame can be effected by manipulation of the adjustment handle at a single joint or at a combination of joints to bring the plates back into precise registration.

These and other objects and features will be pointed out in the course of the following detailed description with reference to the accompanying drawings in which:

FIG. 4 is a section view showing some detail of the frame structure; and

FIGS. 5 and 5A are side and top views of the frame hanger assembly.

In the figures, like reference numerals designate like parts.

Figure 1:
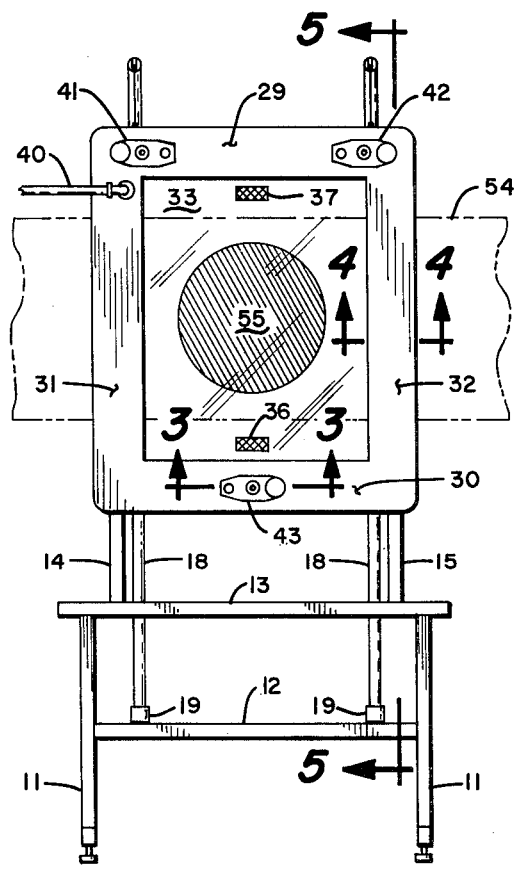
FIG. 1 is a front view of a photoprinting apparatus incorporating an embodiment of this invention.
Figure 2:
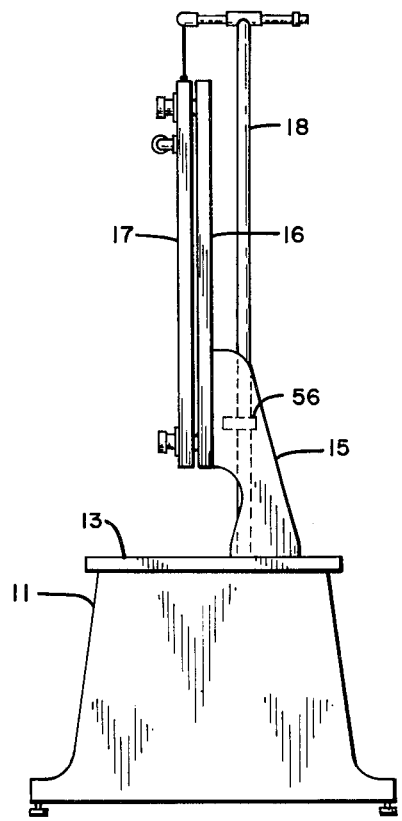
FIG. 2 is a side view of the apparatus in FIG. 1.

The over-all photoprinting apparatus has a main support member comprising a pair of vertically disposed legs 10 and 11 which are suitably anchored to the flooring, a horizontally disposed shelf and counter top, 12 and 13 respectively, attached to the legs and a pair of upright frame braces 14 and 15 which are anchored to the counter top and extend upwardly therefrom. A stationary back frame 16 disposed in a vertical plane is bolted to braces 14 and 15. A movable front frame 17 overlays the back frame in a parallel plane and is supported by a frame hanger assembly. The hanger assembly comprises a pair of laterally spaced apart elongated tubes or rods 18 extending upward from their seating engagement in floating hubs 19 on shelf 12. The combination of the helical spring 20 and the pin 21 which is press fitted through the tube 18 provides means for adjusting the height of the tube. The hanger rods 18 are structurally supported to the main support assembly by brackets 56 which are bolted to the frame braces 14 and 15. Attached at the upper end of tube 18 is an annular bearing 22 and an elongated slider shaft 23 which passes through the opening in bearing 22. Press fitted and silver soldered to the front end of shaft 23 is a hanger socket 24 which has a small slot 25 extending from one end of the socket to a hemispheric depression 26. A ball and cable assembly extends downward from the hanger socket with the ball 27 seated in the depression 26 and cable 28 attached to the ball through sleeve 57. The front frame is attached to the cables by any suitable means along its upper edge and is suspended therefrom in a vertical plane parallel to and overlaying the back frame 16.

The frames 16 and 17 are of a substantially identical rectangular structure comprising top and bottom members 29 and 30 respectively and side members 31 and 32 which define a rectangular opening indicated generally at 33. Encased by frames 17 and 16 within the respective openings and suitably mounted therein, for example by adhesive or vacuum or a combination thereof, are photographic plates 34 and 35. These plates, which are sometimes referred to as glass masters, are prepared by well-known photographic techniques to carry negative or positive images of patterns to be photoprinted as indicated by shaded area 55. In addition to the images on the plates which are to be photoprinted and reproduced on a photosensitized material, each of the plates 34 and 35 carries two registration blocks indicated by shaded areas 36 and 37 respectively, in the form of predetermined pattern arrays which must be aligned in accurate registration to insure that the photoprinted images are precisely registered with one another when projected on opposite sides of the sheet of sensitized material. Preferably the registration blocks are such as described in Patent 2,720,146 issued to Norman B. Mears. As more fully described therein the registration index may comprise photomechanically reproduced patterns of minute opaque dots on one plate and a similar pattern of translucent dots on an opaque background on the other plate so located with respect to the images to be photoprinted that the latter will be in registry with one another when the opaque dots are superimposed on the translucent dots. The plates 34 and 35 are attached to and seated against vacuum seals, such as the gaskets indicated generally at 38 and 39, which are respectively attached to frames 17 and 16 in grooves formed along the inner facing surfaces of the frames. In the well known manner, vacuum is applied to the photoprinting apparatus through tubing, indicated generally at 40, to draw the plates firmly down upon the sheet of material to be photoprinted so that the plates make close contact therewith to ensure that accurately defined patterns are projected upon the sensitized material.

Figure 3:
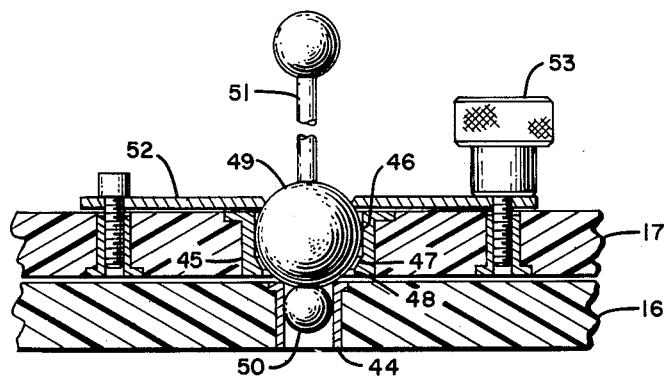
FIG. 3 is a section view showing the details of the frame mounts comprising an embodiment of this invention.

The front movable frame 17 is mounted to the stationary back frame 16 at three points by ball-socket joints 41, 42 and 43 with the former two located on the top member 29 adjacent the respective side members 31 and 32 and the latter centrally located between the side members on the bottom member 30. All of the ball-socket joints are identical and a detailed description of one, as most clearly shown in FIG. 3, is applicable to all.

Bushing 44 having a cylindrical annular opening is press fitted into a counterbored opening through the stationary back frame. In a corresponding location in the movable front frame 17, a bushing 45 having a larger external diameter is fitted in a counterbore opening through the front frame. The front length of the internal bore of bushing 45 is cylindrical, as indicated at 46, and has a rearward length forming a frusto-conical configuration, as indicated at 47, and terminates with a short cylindrical length at 48. A large diameter ball 49 of solid material is silver-soldered to a smaller diameter ball 50 of solid material with an appropriate chamber and the balls are respectively seated in bushings 45 and 44. Threaded into the large diameter ball 49 at a location diametrically opposite where the smaller ball 50 is attached is an elongated bar handle 51 which is utilized to manipulate the large diameter ball around its center. On the front facing surface of frame 17 and extending across the ball joint is a tension plate 52 having a circular opening through which a portion of the larger diameter ball 49 protrudes. At one end the tension plate is attached to the front frame by a bolt threaded into the frame. At the other end the tension plate is attached to the front frame by another bolt which has a knurled knob 53 for adjusting the tension on the plate to thereby adjust the holding force applied by the plate to the large diameter ball. When knob 53 is tightened the tension plate applies sufficient force to the large diameter ball so that it is substantially unmovably seated in bushing 45. To move the large diameter ball about its center with handle 51, knob 53 is loosened to reduce the holding force applied to the ball. It can be visualized then that by appropriate manipulation of the handles 51 at each of the respective ball joint mounts, the movable front frame 17 can be adjusted in its plane with respect to the stationary back frame 16. Initially, when the two frames are coupled to one another with the large and small diameter balls seated in their respective bushings, knobs 53 are tightened somewhat and the handles 51 at the respective joints are manipulated as required to bring the registration blocks on the respective plates into precise registration. Then the knobs 53 are tightened to secure this accurate registration. It can be seen that since the large diameter balls are locked after adjustment so that they are unable to rotate about their centers, the movable front frame 17 can be pulled away from the stationary back frame 16 since the smaller diameter balls will slide in their bushings a sufficient distance to allow insertion of a sheet of material between the two plates on the frames. Essentially the two frames are hinged together by the two joints 41 and 42 on the top members so that the bottom of the front frame 17 can be swung forward from the back frame 16 to a degree sufficient to allow insertion and withdrawal of the webbing to be photoprinted. Any slight misalignment of the plates that may occur during normal use can be readily compensated for by fine adjustments at joint 43 generally, although adjustment at other of the joints is sometimes necessary.

In the practice of this invention, after the frames have been mounted to one another and precisely registered as previously described, the bottom of the front frame 17 is swung away from the back frame 16 a sufficient degree to allow a suitable length of sensitized webbing, indicated by dashed lines 54, to be drawn from left to right between the frames and their plates. When a section of the webbing on which the images are to be photoprinted is positioned within the openings 33 between the plates, the front frame is swung back toward the back frame and clamped thereto, by means not shown, and vacuum is applied through hosing 40 to draw plates 34 and 25 into contact with the respective surfaces of the coated webbing. The alignment of the respective registration blocks 36 and 37 is visually checked to insure that the registration indices are superimposed. If not, the vacuum and the clamp are released, and handle 51 at joint 43 in the bottom members of the frame is manipulated, which is generally sufficient to bring the plates back into precise registration. The vacuum and clamp are reapplied, and the surfaces of the webbing are exposed to actinic light of suitable power for a suitable period of time through the plates to project the images onto the respective surfaces. The vacuum is then released by allowing atmospheric air into the tubing 40, and the frames are unclamped. The front frame is again swung away from the back frame to allow the withdrawal of the photoprinted section of the webbing while a further section which is to be photoprinted is inserted. Detailed descriptions of methods and apparatus for preparing the webbing with light-sensitive coatings are contained in Patents 2,710,591; 2,710,814; 2,786,443 and 2,791,515 all issued to Norman B. Mears. In addition, Patents 2,720,146; 2,751,829; 2,762,149 and 2,822,635 issued to Norman B. Mears contain detailed description of methods and apparatus for processing the light-sensitive webbing to which this invention is readily adaptable.

The case with which the apparatus may be disassembled and assembled is evident. All that is required is that the vacuum tubing be removed and the frames unclamped from one another before firmly grasping both sides of the frame 17 and pulling forward to remove the small diameter balls 50 from their respective bushings. The front frame can then be completely separated from its supporting structure by lifting ball 27 out of the depression 26 in the hanger socket 24 while sliding cable 28 out of the hanger socket through slot 25. If replacement of the large or small diameter balls is necessary, this is readily accomplished simply by unthreading the screws which attach tension plate 52 to the front frame 17 and pulling the balls forward through bushing 45 in the front frame. It is further apparent that because of the relative simplicity of the structure of this invention, the chances of individual piece parts wearing out of tolerance during normal use are very slim so that maintenance is held to a minimum. Despite the relative simplicity in comparison to devices utilized in the past, the high degree of precise registration required is still maintained and any occasional fine adjustment is readily accomplished. The front movable frame can be adjusted in any direction in its plane by manipulation of the adjusting handle attached to one of the ball-socket joints. Preferably, this is done at the joint located on the bottom member of the frame.

It is contemplated that a fourth ball socket joint centrally located between joints 41 and 42 in top frame member 29 can be incorporated. The additional ball socket joint is preferably vertically aligned with joint 43 so that an imaginary vertical line through the center of the two joints passes through the center of the registration blocks. Although in general the front movable frame can be adjusted satisfactorily at either of the joints 41, 42 or 43 or any combination of the three, it has been found that the inclusion of a fourth adjustable joint, as described above, has facilitated some of the adjustments.

What is claimed is:

1. Photoprinting apparatus, comprising: a first photoprinting frame; a second photoprinting frame coextensive with and overlying said first frame in a parallel plane; and means for adjustably mounting the second frame to the first frame comprising a plurality of ball-socket joints each including a first diameter ball of solid material snugly but movably seated in said second frame and a smaller diameter ball of solid material fixedly attached to said first ball and snugly but movably seated in said first frame.

2. Photoprinting apparatus, comprising: a pair of substantially coextensive photoprinting frames overlying one another in parallel planes, each frame including a registration index; a plurality of ball-socket joints for adjustably mounting said frames to one another, each joint including a first diameter ball of solid material snugly but movably seated in one of the frames and a smaller diameter ball of solid material fixedly attached to said first ball and snugly but movably seated in the other frame; and a handle attached to at least one of said first diameter balls on a line diametrically opposite where the corresponding smaller diameter ball is attached for moving said first diameter ball about its center whereby the frames are adjustable to align the respective registration indices.

3. Apparatus as in claim 2 further including means attached to one of said frames for releasably locking said first diameter balls in unmovable seating engagement.

4. Photoprinting apparatus, comprising: a main support; a first photoprinting frame fixedly attached to said main support; a second photoprinting frame substantially coextensive with and overlaying said first frame in a parallel plane; each of said frames enclosing an attached photoprinting plate having a registration block and an image to be reproduced in registry respectively on corresponding major surfaces of a sheet of webbing between said frames; means for mounting said second frame to said first frame whereby said second frame is adjustable in its plane to superimpose said registration blocks and is movable away from said first frame to allow insertion and withdrawal of said webbing between the frames, said means comprising a plurality of ball-socket joints each including a first diameter ball of solid material snugly but movably seated in said second frame, a smaller diameter ball of solid material fixedly attached to said first ball and snugly but movably seated in said first frame and a handle attached to said first ball at a position diametrically opposite where said smaller diameter ball is attached for selectively moving said first ball about its center when seated in said second frame; and means attached to said second frame for releasably locking said first balls in unmovable seating engagement.

5. Photoprinting apparatus, comprising: a pair of overlying planar coextensive rectangular photoprinting frames each having a top member, a bottom member and opposite side members defining an opening containing an attached plate having a registration pattern and an image to be photographically reproduced in registry on opposite sides of a sheet of webbing between said frames; means for adjustably mounting said frames together whereby one frame is movable with respect to the other frame to superimpose said registration patterns and to permit insertion and withdrawal of said webbing between the frames, said means comprising a pair of ball-socket joints on said top members each adjacent an opposite side member, a third ball-socket joint in said bottom members substantially centrally located between said side members, each joint including a first diameter ball of solid material snugly but movably seated in a frusto-conical portion of an opening through one of said frames, a smaller diameter ball of solid material fixedly attached to said first ball and snugly but movably seated in a cylindrical opening in the other of said frames and a handle attached to said first ball at a position diametrically opposite where said smaller diameter ball is attached for selectively moving said first ball about its center when seated in said one frame; and means attached to said one frame for releasably locking said first ball in unmovable seating engagement.

6. Photoprinting apparatus, comprising: a first frame having an opening containing an attached photographic plate carrying an image to be photographically reproduced on one side of a sheet of light sensitized material and a registration index; a second frame substantially similar to and overlaying said first frame having an opening containing an attached photographic plate carrying an image to be photographically reproduced on the other side of the sheet of light sensitized material and a corresponding registration index; and at least two ball-socket joints for adjustably coupling said frames together, each of said joints comprising a cylindrical bore passing from front to back through said first frame, a first ball of solid material snugly but movably engaged in said bore, a bore through said second frame located at a corresponding position on said second frame having a front cylindrical portion and rear frusto-conical portion, a second ball of solid material having a diameter larger than said first ball seated snugly but movably in the bore in the second frame and rigidly attached to said first ball at its rearward facing surface when seated, a portion of the surface of said larger diameter ball protruding beyond the front surface of said second frame when seated, a handle detachably engaged with said forward protruding surface for selectively moving said larger diameter ball about its surface when seated whereby the frames are adjustable with respect to one another to precisely align the respective registration indices, a tension plate detachably mounted to the front surface of said second frame in pressing contact with said larger diameter ball, and means for varying the force applied to the larger diameter ball by said tension plate whereby said ball is locked in its adjusted seated position.

References Cited by the Examiner

UNITED STATES PATENTS 1,786,070   12/30   Jones _____ 95—73
2,720,146   10/55   Mears _____ 95—73

EVON C. BLUNK, *Primary Examiner.*